June 26, 1962 B. OSTENDORF, JR., ET AL 3,041,396

RECEIVING SELECTOR FOR PERMUTATION CODES

Filed May 23, 1960 4 Sheets-Sheet 1

INVENTORS B. OSTENDORF, JR.
G. PARKER
BY
John E. Cassidy
ATTORNEY

RECEIVING SELECTOR FOR PERMUTATION CODES

Filed May 23, 1960 4 Sheets-Sheet 2

INVENTORS B. OSTENDORF, JR.
G. PARKER
BY
John E Cassidy
ATTORNEY

RECEIVING SELECTOR FOR PERMUTATION CODES

Filed May 23, 1960 4 Sheets-Sheet 3

INVENTORS B. OSTENDORF, JR.
G. PARKER
BY John E. Cassidy
ATTORNEY

RECEIVING SELECTOR FOR PERMUTATION CODES

INVENTORS B. OSTENDORF, JR.
G. PARKER
BY
John E. Cassidy
ATTORNEY

United States Patent Office 3,041,396
Patented June 26, 1962

3,041,396
RECEIVING SELECTOR FOR PERMUTATION CODES

Bernard Ostendorf, Jr., Stamford, Conn., and George Parker, New York, N.Y., assignors to Bell Telephone Laboratories, Incorporated, New York, N.Y., a corporation of New York Filed May 23, 1960, Ser. No. 30,805
9 Claims. (Cl. 178—26)

Figure 1:
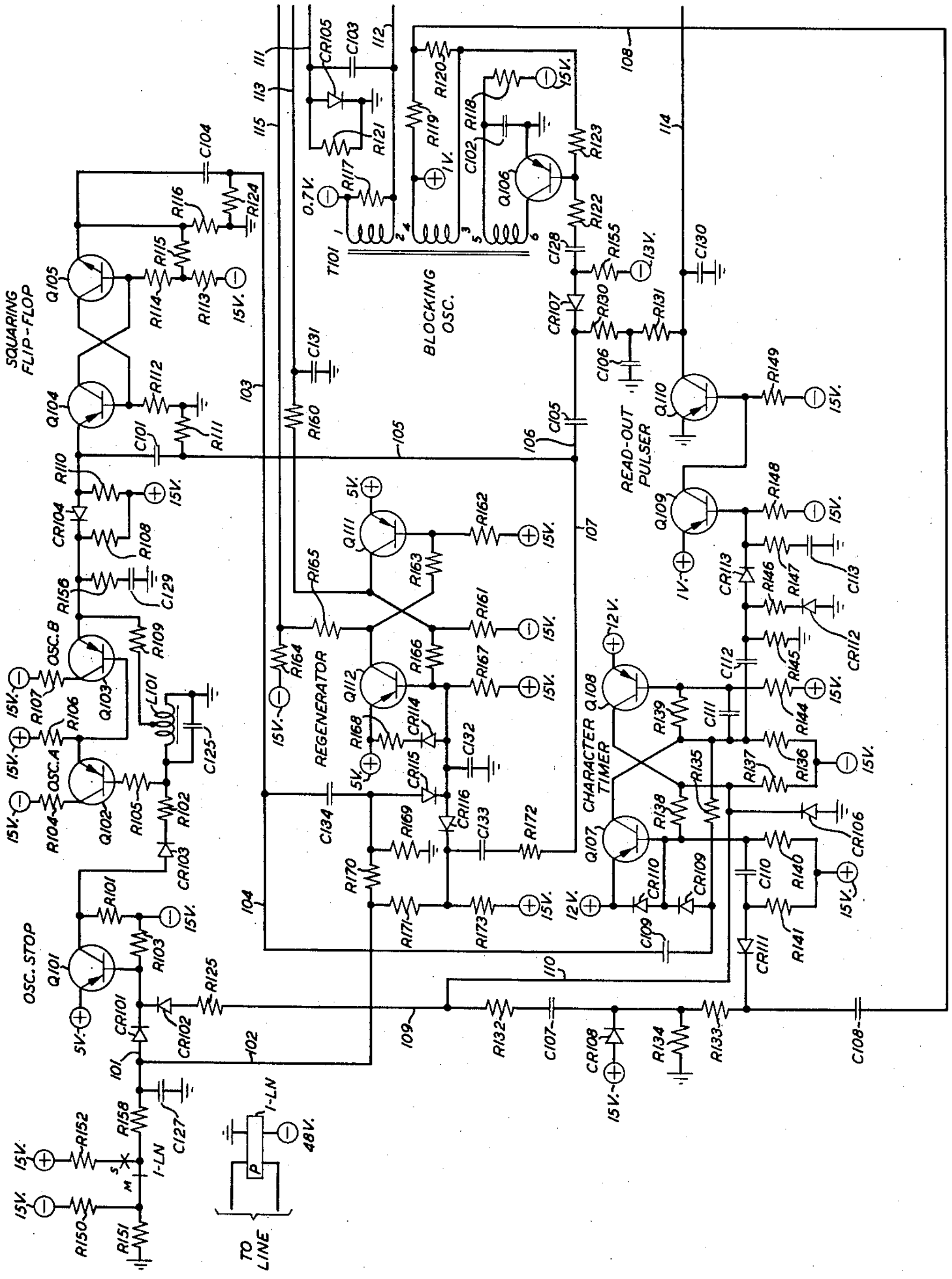

This invention relates to a telegraph receiving selector for permutation code signals and more particularly to a receiving and selecting circuit which receives and decodes telegraph code signals.

A broad object of this invention is to provide an improved receiving selector circuit for permutation code signals.

In previous telegraph systems which provide circuit arrangements for decoding telegraph code signals, each element of the permutation code signal is accumulated in a receiving circuit during the reception of the code signal whereby all the elements are simultaneously available for translation during the interval between the reception of the last element of the signal and the first element of the next successive signal. During this interval, a decoding circuit is activated to scan the accumulated signal elements and effect a translation in accordance with the scanned elements. In certain prior systems of this type, electromechanical decoding circuits, such as relay fans for example, are utilized. In high-speed signaling systems, however, the interval between the signals is insufficient in duration to permit the relays to fully operate thereby, necessitating storage circuits intermediate the receiving circuit and the decoding circuit for storing the elements for a duration of time greater than the interval between the code signals.

A further object of this invention is to provide an improved receiving circuit which directly cooperates with an electromechanical decoding circuit.

Another object of this invention is to maintain all the elements of each received code signal accumulated in a receiving circuit for a duration of time greater than the interval between the code signals.

In accordance with a preferred embodiment of the present invention, the receiving circuit includes a start-stop oscillator which is activated in response to the reception of the start element of each seven-element start-stop telegraph code signal to generate an element pulse for each element of the code signal and is deactivated after generating the seven element pulses. A multistage shift register utilizes the element pulses for accumulating the received signal elements in the shift register stages. A timing circuit whose operation is initiated by the generation of the seventh element pulse precludes the application of the first element pulse of the next successive code signal to the shift register in the event that the interval between the code signals is less than the duration of two signal elements. The output of the shift register is applied to a relay fan or tree which is enabled by the generation of the seventh element pulse whereby the relay fan decodes the five intelligence elements of the code signal accumulated in the shift register. Since the application of the first element pulse of the next successive code signal to the shift register is precluded in the event that the next signal immediately follows, it is evident that the storage condition of the shift register is maintained for the duration of at least the stop element and the next successive start element whereby the relay fan is provided sufficient time to extract the information and fully operate.

Figure 2:
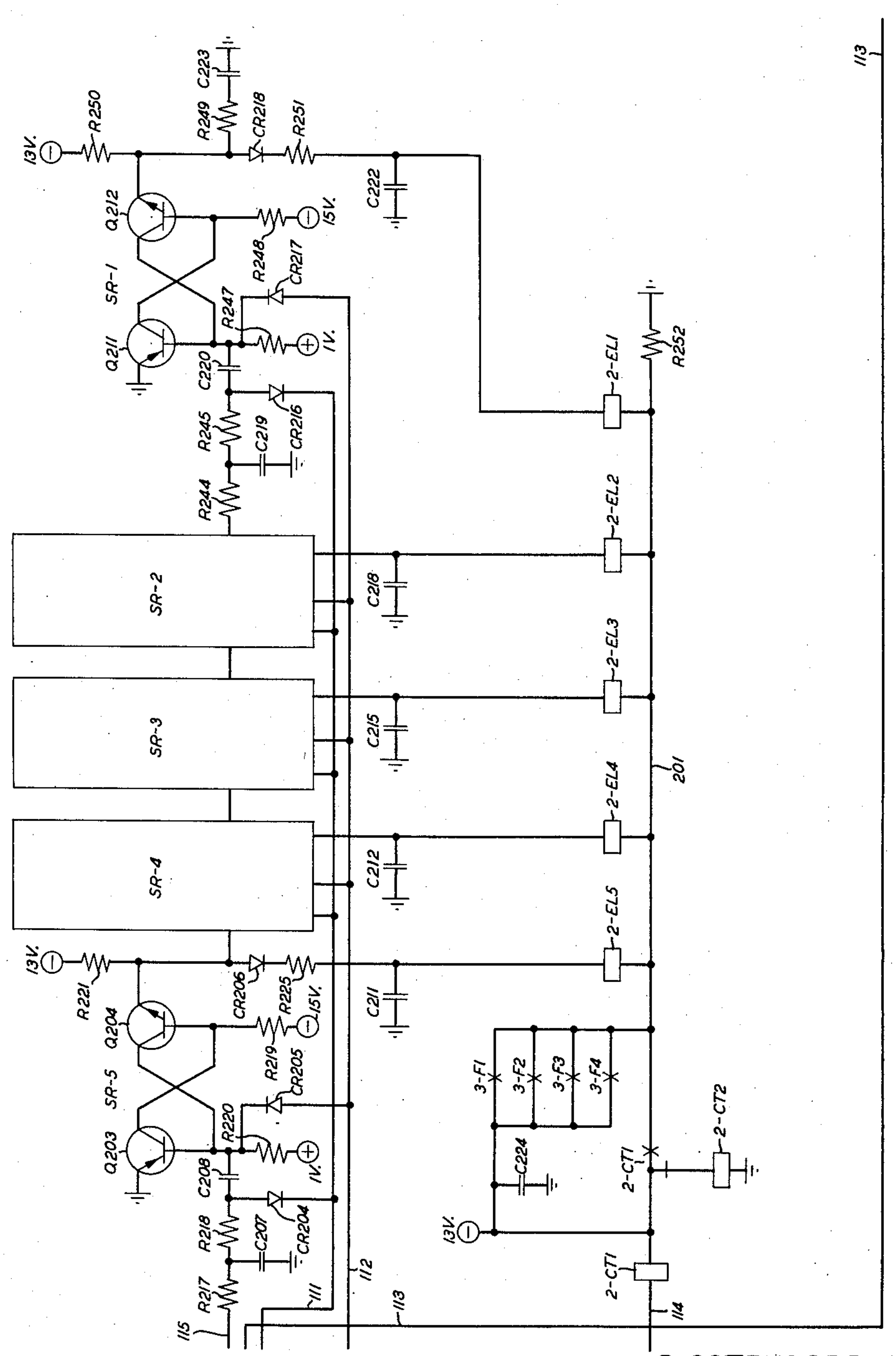
Figure 3:
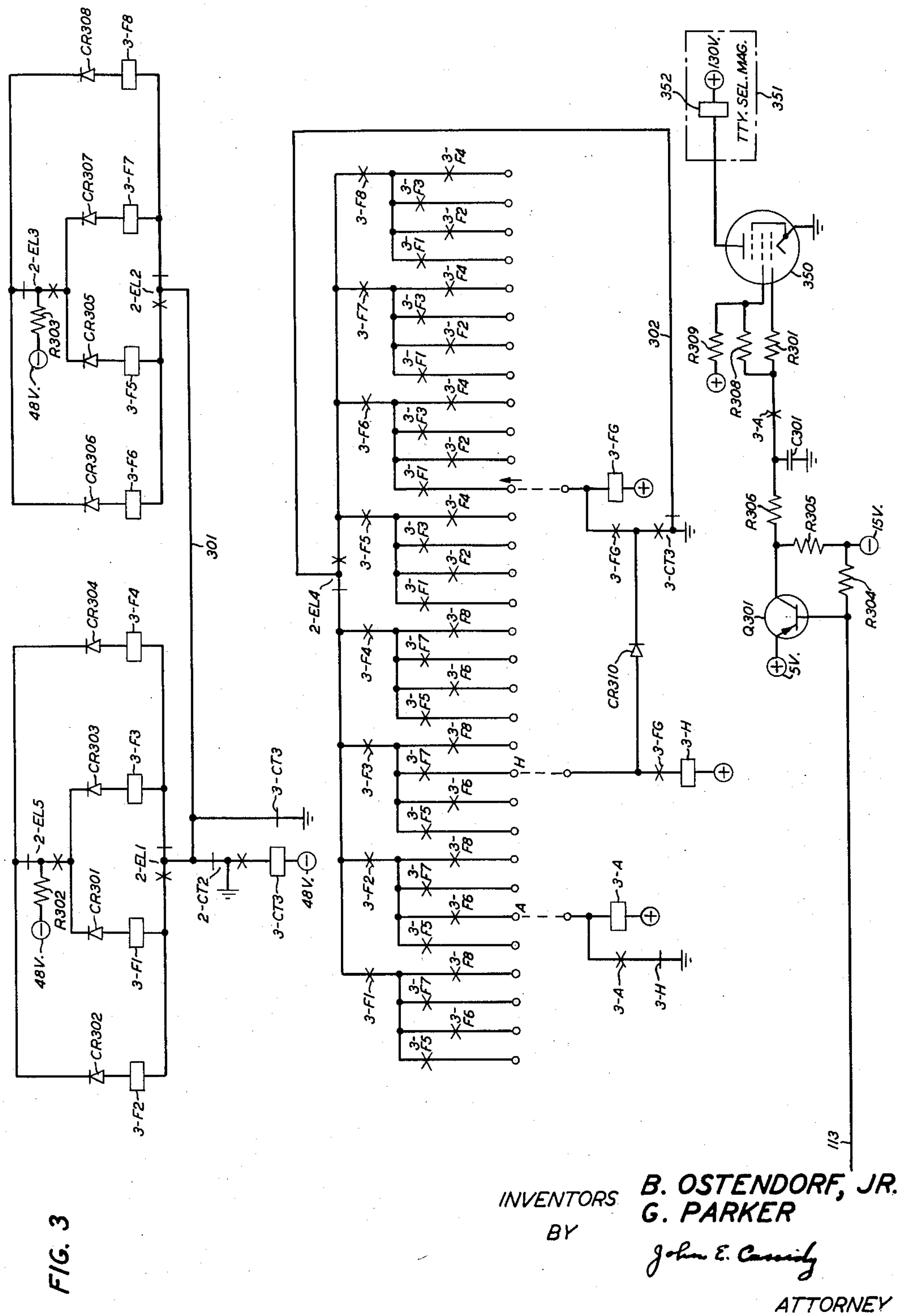
Figures 4, 5:
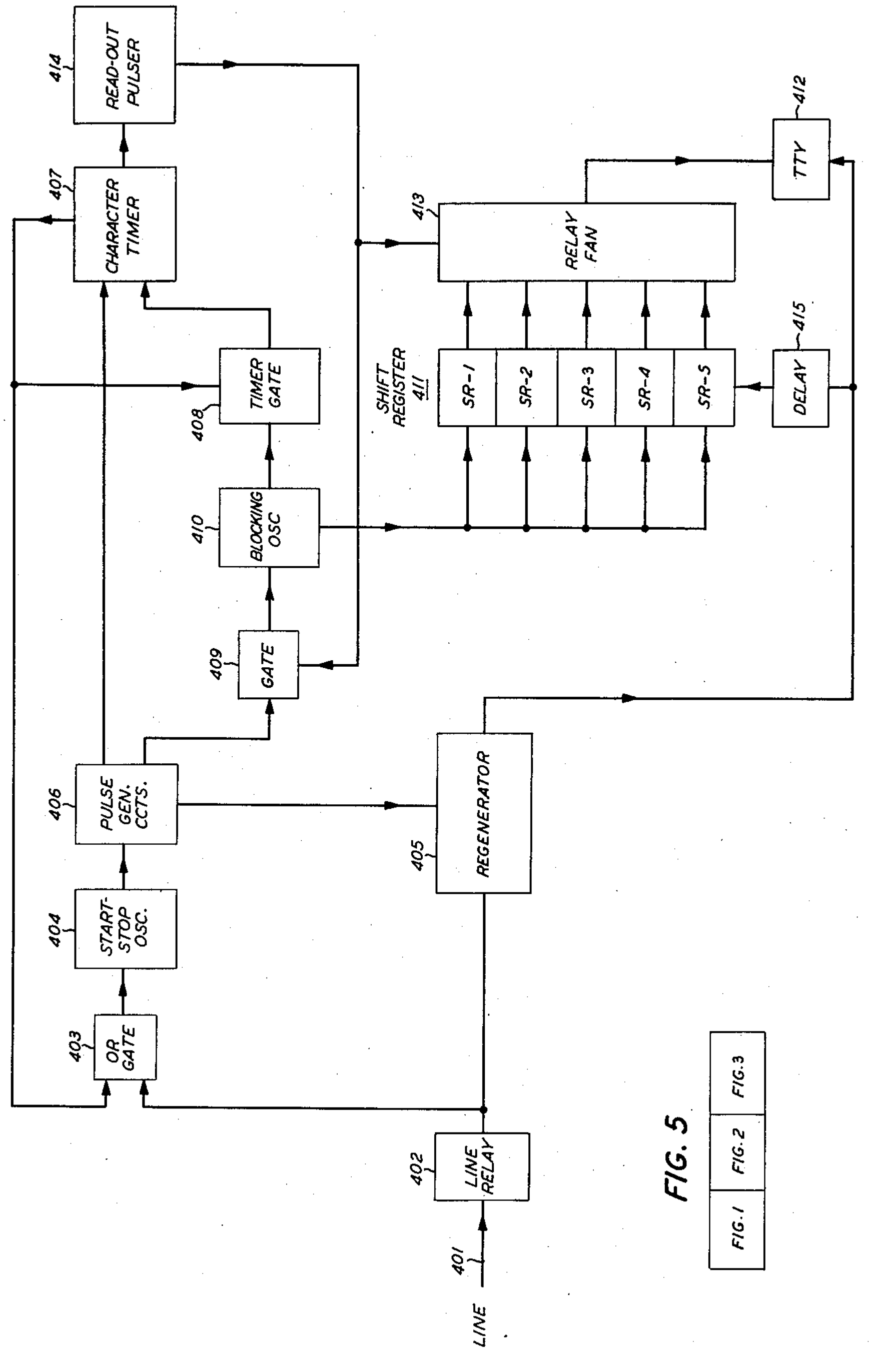

The means for fulfilling the foregoing objects and the practical embodiment of the features of this invention will be fully understood from the following description taken in conjunction with the accompanying drawing wherein:

FIGS. 1–3, when arranged as shown in FIG. 5, show the details of circuits and equipment which cooperate to form a receiving selector in accordance with this invention; and FIG. 4 illustrates in block form the various equipment and circuits of the system and the manner in which they cooperate.

In several figures of the drawing, the relay contacts are shown detached from the relay windings. Contacts which are closed when the associated relay is de-energized, known as "break contacts," are represented by a single short line perpendicular to the conductor line, while contacts which are closed when the relay is energized, known as "make contacts," are represented by two short cross lines diagonally intersecting the conductor line.

Referring now to FIG. 4, incoming line signals from line 401 are applied to the line relay indicated by block 402 which repeats the signals to regenerator 405. In addition, line relay 402 responds to the spacing start element of each teletypewriter signal by providing an enabling signal to start-stop oscillator 404 by way of OR gate 403 whereby start-stop oscillator 404 provides oscillations at the rate of one cycle per teletypewriter signal element. The output of start-stop oscillator 404 is applied to pulse generator circuit 406 which generates a pulse at the midpoint of each oscillator cycle corresponding to the midpoint of each signal element. These generated pulses are applied to character timer 407, gate 409 and regenerator 405.

The application of the first generated pulse to character timer 407 activates the character timer which in turn maintains the application of an enabling signal to start-stop oscillator 404 by way of OR gate 403 thereby maintaining oscillator 404 in the oscillating condition. In addition, the activation of character timer 407 provides a pulse to timer gate 408 whereby timer gate 408 blocks pulses applied thereto for a duration of time equal to the interval required by pulse generator 406 to generate six pulses.

Returning now to pulse generator 406, each output pulse which occurs at the midpoint of the signal element is applied by way of gate 409 to blocking oscillator 410. Blocking oscillator 410 responds to each generated pulse by providing a shift pulse to shift register 411 and a restore pulse to timer gate 408. Timer gate 408, however, blocks the first six pulses of blocking oscillator 410, as previously described.

When blocking oscillator 410 generates the seventh pulse corresponding to the stop element of the teletypewriter signal, the pulse is applied by way of timer gate 408 to character timer 407, deactivating character timer 407 whereby the enabling signal applied to start-stop oscillator 404 is removed. Accordingly, start-stop oscillator 404 stops after providing seven oscillations. In addition, the deactivation of character timer 407 operates read-out pulser 414 which, in response thereto, provides a read-out pulse to relay fan 413 and a momentary disabling pulse to gate 409.

Assuming that the next teletypewriter signal is received immediately after the reception of the previous stop element, start-stop oscillator will be restarted again in the same manner as previously described and pulse generator 406 will generate pulses at the midpoint of each element of the new teletypewriter signal. Character timer 407 will be reactivated to maintain start-stop oscillator 404 operating. However, the first pulse generated by pulse generator 406 will not be applied to blocking oscillator 410 by way of gate 409 since gate 409 is momentarily blocked by read-out pulser 414. This momentary block is removed immediately after character timer 407 is activated whereby the second pulse generated by pulse generator 406 is applied by way of gate 409 to blocking oscillator 410. Accordingly, the first shift pulse normally generated by blocking oscillator 410 is deleted in the event that a teletypewriter signal immediately follows the previous signal.

The pulse generated at the midpoint of each signal element by pulse generator 406 is applied to regenerator 405 enabling regenerator 405 to repeat each signal element received by line relay 402. This regenerated signal element is applied to normally disabled teletypewriter recorder 412 and to stage SR–5 of shift register 411 by way of delay circuit 415. Delay circuit 415 delays the application of the regenerated signal element to shift register 411 whereby the first or spacing start element is shifted into shift register stage SR–5 by the second blocking oscillator shift pulse. Similarly, the second received element which comprises the first intelligence element is shifted into shift register stage SR–5 by the third shift pulse. In addition, the third shift pulse shifts the spacing start element stored in stage SR–5 into stage SR–4 of shift register 411. It is thus seen that the seventh blocking oscillator shift pulse shifts the five intelligence elements into shift register stages SR–1 through SR–5.

Simultaneously, with the generation of the seventh shift pulse and the consequent storage of the five intelligence elements of the teletypewriter signal in the five stages of the shift register, read-out pulser 414 provides a read-out pulse to relay fan 413, as previously described. Relay fan 413, in response to the read-out pulse, translates the teletypewriter signal elements stored in shift register 411 and enables or disables teletypewriter recorder 412 in accordance with the translation of the teletypewriter signal stored in shift register 411.

Assuming now that the next teletypewriter signal is received immediately thereafter whereby the first shift register pulse is deleted as previously described, the seventh or marking stop element of the previous teletypewriter signal is not shifted into stage SR–5 of shift register 411. Accordingly, the storage condition of shift register 411 is maintained for an interval of time equal to the duration of at least two signal elements. Since fan circuit 413 comprises electromechanical relay elements, maintaining the storage condition of shift register 411 for two signal elements provides ample time for the relay elements in fan circuit 413 to operate properly.

The generation of the second shift register pulse now shifts the spacing start signal of the new teletypewriter signal into shift register stage SR–5. The remaining elements in the new teletypewriter signal are stored in shift register 411 in the same manner as previously described for the previous teletypewriter signal.

Referring now to FIG. 1, polarized line relay 1–LN is in series with the incoming line. When the incoming line is in the marking or idle condition, the marking contacts of relay 1–LN are closed, applying the negative potential at the junction of voltage divider resistors R150 and R151 to lead 101 by way of resistor R158. When relay 1–LN is operated to spacing in accordance with the input signals, the potential on lead 101 is rendered positive by way of resistor R152, the spacing contacts of relay 1–LN and resistor R158.

The positive and negative potentials applied to lead 101 are also applied to the junction of resistors R170 and R171 by way of lead 102. Resistors R170 and R171 are associated with the signal regenerator which includes transistors Q111 and Q112. The operation of the regenerator is described hereinafter.

Lead 101 is connected to diode CR101 which together with diode CR102 form an "OR" gate. If either of leads 101 or 109, which leads comprise the inputs to the gate, is positive, that positive potential will be applied by way of the gate to the base of oscillator stop transistor Q101. If both of the inputs are negative, the base of transistor Q101 will be driven negative by the negative battery connected to the base by way of resistor R103.

In the idle marking condition, lead 109 is negative, as described subsequently, and lead 101 is negative, as previously described. This permits the base of transistor Q101 to go negative, turning on the transistor, and collector current flows by way of diode CR103, resistor R102 and inductor L101 to ground. This has two effects on the tuned circuit of which inductor L101 and capacitor C125 are part: (1) The low impedance formed by transistor Q101 and the resultant current flow through inductor L101 prevent oscillations from building up in the tuned circuit. (2) The actual current flow represents the starting point of the oscillation cycle of the tuned circuit when the idle condition is removed by cutting off transistor Q101.

Starting from the idle marking condition, the spacing start element of the line signal operates to apply a positive potential by way of the spacing contacts of relay 1–LN and diode CR101 to the base of transistor Q101 whereby transistor Q101 is cut off. This causes a drop of the collector voltage of transistor Q101 to a negative value, thereby back-biasing diode CR103 and cutting off the current flow through inductor L101. With the holding effect of transistor Q101 removed, an oscillatory condition is established for transistors Q102 and Q103 and their associated tuned circuit comprising inductor L101 and capacitor C125. The oscillation starts from nearly zero voltage across the tuned circuit beginning with the negative half cycle.

The oscillator circuit arrangement is that of two emitter followers in tandem with feedback from the second emitter circuit to the center tape of inductor L101 via resistor R109 to supply in-phase aiding current to inductor L101 to maintain oscillations in the tuned circuit. Each of the transistor emitter followers Q102 and Q103 has a voltage gain of approximate unity and a high current gain. The emitter voltage of transistor Q102 closely follows the voltage input to the base which is based on the ground supplied to the tuned circuit and the oscillating voltage across the tuned circuit. Similarly, the emitter voltage of transistor Q103 closely follows the voltage input to the base which is based on the emitter voltage of transistor Q102. The values of resistors R102, R105 and R109 and capacitor C125 are adjusted in accordance with the incoming signaling line speed and resistor R109 may be further adjusted to maintain constant amplitude oscillations in the tuned circuit. Diode CR103 isolates the oscillator from any shunting effects of transistor Q101 while the transistor is nonconductive.

Oscillations continue at the rate of one cycle per teletypewriter signal until transistor Q101 is again restored to the ON condition, as described subsequently, re-establishing the holding current through inductor L101. As will be shown, once oscillations start transistor Q101 is maintained in its OFF condition for at least seven cycles.

The emitter output of transistor Q103 is applied by way of diode CR104 to the emitter of transistor Q104. Transistors Q104 and Q105 are arranged in a "hook" circuit. In this circuit the two transistors are either both in the ON or both in the OFF condition. Whenever the emitter of transistor Q104 becomes positive, the transistor turns on, applying its positive collector potential to the base of transistor Q105. Transistor Q105 is thus turned on and its negative collector potential is applied to the base of transistor Q104, maintaining that transistor conductive. Conversely, whenever the emitter of transistor Q104 becomes negative, transistor Q104 turns off and its negative collector potential applied to the base of transistor Q105 turns the transistor off whereby the base of transistor Q104 is rendered more positive. It is thus seen that when the transistors are on, the emitter potential of transistor Q104 follows the collector potential of transistor Q105 which in turn follows the emitter potential of transistor Q105 and that the emitter potential of transistor Q105 follows the collector potential of transistor Q104 which in turn follows the emitter potential of transistor Q104. Accordingly, the emitters of the transistors are maintained at substantially the same potential when the circuit is conducting.

In the normal idle condition, a positive potential is applied to the emitter of transistor Q104 by way of resistor R110 and a negative potential is applied to the emitter of transistor Q105 from the junction of resistors R115 and R116 which are connected in series with resistor R113 across negative battery and ground. This holds transistors Q104 and Q105 in the ON condition providing sufficient current flow through resistor R110 to the emitter of transistor Q104 and from the emitter of transistor Q105 to the junction of resistors R115 and R116 to maintain the emitter potentials slightly negative with respect to ground.

Near the beginning of the negative cycle of oscillation, the emitter of transistor Q103 goes negative and the emitter of transistor Q104 follows the emitter voltage of transistor Q103 by way of negative clamping diode CR104 and the emitter of transistor Q105 follows the emitter voltage of transistor Q104. When the negative potential of the emitter of transistor Q105 approaches the negative potential normally applied to the junction of resistors R115 and R116 when transistor Q105 is off, the emitter cannot further follow the emitter potential of transistor Q104 whereby both transistors turn off. In the OFF condition the emitter of transistor Q104 continues to follow the emitter potential of transistor Q103 while the emitter of transistor Q105 is maintained negative by voltage divider resistors R115 and R116.

When the emitter voltage of transistor Q103 subsequently passes through zero volts in a positive-going direction, the emitter voltage of transistor Q104 becomes positive wth respect to the ground applied to the base by way of resistor R112 whereby transistors Q104 and Q105 are made suddenly conductive. The emitter voltage of transistor Q104 is thus driven in a negative direction and the emitter voltage of transistor Q105 is driven in a positive direction. Since the oscillations start with the negative half cycle, this change occurs at the center of each cycle of oscillation corresponding to the midpoint of the signal element.

A differentiating network consisting of capacitor C104 and resistor R124 is connected to the emitter of transistor Q105. When transistor Q105 switches to the ON condition at the midpoint of the signal element, the positive emitter potential change results in a short positive pulse applied to lead 103 by way of the differentiating network.

Another differentiating network consisting of capacitor C101 and resistor R111 is connected to the emitter of transistor Q104. The negative potential change of the emitter of transistor Q104, when the transistor turns on, causes a short negative pulse to be applied to lead 105 by way of this differentiating network.

The positive pulse on lead 103 is applied to the base of transistor Q112 in the regenerator by way of capacitor C134 and diode CR115 when the diode is forward-biased and is applied to the base of transistor Q107 in the character timer circuit by way of lead 104, capacitor C109 and diode CR109. The negative pulse on lead 105 is applied to the base of transistor Q112 by way of lead 107, resistor R172, capacitor C133 and diode CR116 when the diode is forward-biased and is applied to the base of blocking oscillator transistor Q106 by way of lead 106, capacitor C105, diode CR107 when it is forward-biased, capacitor C128 and resistor R122.

The circuit of transistor Q106 and the associated transformer T101 is arranged as a one-shot triggered blocking oscillator. Transistor Q106 is normally cut off by the one-volt positive potential applied to the base by way of the 4–3 winding of transformer T101 and resistor R123. When a negative pulse is applied to the base of transistor Q106 from lead 105, the transistor will start conducting. This pulse, used to trigger transistor Q106, is obtained if diode CR107 is forward-biased. The control of diode CR107 is described subsequently.

When transistor Q106 turns on, the increasing collector current is applied via winding 6—5 of transformer T101 resulting in a negative current flow via winding 4—3 and resistor R123 to the base of transistor Q106 whereby the collector current and in turn the current via winding 4—3 increases more rapidly. The collector current continues to increase until the transformer core nears saturation, slowing the increase in the negative current via winding 4—3. This in turn slows the increase of the collector current reducing the negative current via winding 4—3 whereby the collector current is decreased, reversing the induced current in the 4—3 winding to a positive current which turns off transistor Q106. The interval between the turning on and the turning off of transistor Q106 is arranged to be approximately 60 microseconds.

Three outputs are derived from transformer T101. A negative pulse is obtained from terminal 3 of winding 3—4 and applied to lead 108 by way of resistor R120. This pulse is applied to the character timer circuit in a manner described hereinafter. The positive pulse which appears about 60 microseconds later is not used. A positive pulse is developed at terminal 2 of transformer T101 and applied to lead 112. This pulse is also applied to lead 111 by way of capacitor C103 but is substantially shunted to ground by way of diode CR105. The negative pulse which appears on terminal 2, about 60 microseconds, is not used on lead 112 but is applied by way of capacitor C103 to lead 111. Accordingly, the positive pulse on lead 112 occurs about 60 microseconds before the negative pulse on lead 111. The pulses on leads 111 and 112 are applied to the shift register circuit in FIG. 2, as described hereinafter.

Transistors Q107 and Q108 of the character timer circuit are arranged in a bistable flip-flop circuit. The cross coupling from the collector of each transistor to the base of the other insures that if one of the transistors is off, the other is on. In the marking idle condition, transistor Q107 is normally on and consequently, transistor Q108 is off. When a teletypewriter signal is received, the oscillator starts oscillating and causes a positive pulse to be applied to lead 103, as previously described, and then by way of lead 104, capacitor C109 and diode CR109 to the base of transistor Q107. The first of these positive pulses which occurs at the midpoint of the spacing start signal will switch transistor Q107 to the OFF condition. Transistor Q107, going off, causes transistor Q108 to switch on. The collector voltage of transistor Q108 will suddenly rise to about +12 volts as determined by the voltage on the emitter of transistor Q108. This collector voltage is applied by way of leads 110 and 109 and resistor R125 to gate diode CR102 whereby the base of transistor Q101 is maintained positive and transistor Q101 is maintained in the OFF condition, as previously described. Accordingly, with transistor Q108 conducting, transistor Q101 is maintained nonconducting and the oscillator is maintained oscillating.

It is noted that the collector potential of transistor Q108 in the OFF condition is maintained substantially at ground potential by diode CR106. Accordingly, when transistor Q108 turn on, the positive charge in the collector potential is 12 volts. This voltage is also applied by way of lead 110, resistor R132 and capacitor C107 to the junction of diode CR108 and resistor R134. Since diode CR108 is connected to a positive potential, the junction of diode CR108 and resistor R134 is normally maintained positive whereby the positive-going collector voltage of transistor Q108 substantially increases the positive voltage on the junction of diode CR108 and resistor R134 and this substantial positive potential is applied by way of resistor R133 to diode CR111, back-biasing diode CR111 whose other terminal is connected to a positive potential by way of resistor R141. Under this condition, diode CR111 prevents the negative pulse applied to lead 108 by transformer T101 from reaching the base of transistor Q107.

After the application of the positive pulse by way of capacitor C107, the capacitor discharges to ground by way of resistor R134. The value of resistor R134 is adjusted to control the rate of the discharge of capacitor C107 in such a way to keep diode CR111 back-biased during the pulses on lead 108 corresponding to the first six squaring flip-flop pulses. The next pulse corresponding to the seventh flip-flop pulse, however, finds the back-biasing of diode CR111 sufficiently reduced to pass the negative pulse on lead 108 to the base of transistor Q107 by way of capacitor C110, turning transistor Q107 on. Transistor Q107 going on, causes transistor Q108 to turn off. With transistor Q108 turned off, the positive collector potential is removed from lead 109 and assuming that the incoming line is in the marking condition, transistor Q101 turns on, stopping the oscillator after seven cycles of oscillations. At the same time, the turning on of transistor Q107 drives its collector potential in a positive-going direction and this positive-going potential is applied by way of capacitor C112 and diode CR113 to the base of transistor Q109 in the read-out pulser circuit.

Transistor Q109 is normally in the ON condition since its base is connected to negative battery by way of resistor R148. The turning on of transistor Q107 during the reception of the marking stop element applies a positive potential swing to the base of transistor Q109, as previously described, causing transistor Q109 to go to the OFF condition.

In addition, the positive collector swing of transistor Q107 applies a positive charge to the plate of capacitor C112 connected to diode CR113 and applies a positive potential charge to capacitor C113 by way of resistor R147.

If the teletypewriter signal which caused the turn-off of transistor Q109 is followed by a steady marking line condition, then capacitor C112 will discharge by way of resistor R145 and also by way of diode CR113 and resistor R148. In consequence, the base potential of transistor Q109 is reduced until the transistor turns on again. The capacitance of capacitor C112 and the resistances of resistors R145 and R148 are arranged to provide a delay of at least the duration of two character elements before the base voltage of transistor Q109 is sufficiently lowered to turn the transistor on.

If the teletypewriter signal which caused the turn-off of transistor Q109 is followed immediately by the next teletypewriter signal, then transistor Q107 going off during the start pulse applies its negative-going collector potential to diode CR113 by way of capacitor C112 thereby back-biasing diode CR113 and precluding the operation of the above-described discharge delay circuit. Capacitor C113 which has a capacitance substantially smaller than capacitor C112 can now discharge by way of resistors R147 and R148. Since capacitor C113 has a relatively small capacitance, the interval required to reduce the base potential of transistor Q109 to turn on transistor Q109 is about three milliseconds.

Accordingly, transistor Q109 which is normally on, is turned off while the stop pulse is being received and turns back on after a delay equal to the duration of two signal elements or several milliseconds after the midpoint of the next spacing start signal, whichever occurs sooner.

The collector of transistor Q109 is directly coupled to the base of transistor Q110. Accordingly, transistor Q110 is on whenever transistor Q109 is off and conversely, transistor Q110 is off whenever transistor Q109 is on. The collector of transistor Q110 controls gate diode CR107 by way of the filter circuit which comprises resistors R131 and R130 and capacitor C106 connected to the junction of resistors R131 and R130. The collector of transistor Q110 is normally maintained at a negative potential provided by negative battery supplied via the winding of relay 2–CT1, FIG. 2, and lead 114. This negative potential is also applied to diode CR107 by way of the filter circuit. Since the other terminal of diode CR107 is connected to negative battery by way of resistor R155, diode CR107 is normally biased to pass the negative pulses applied from lead 106 by way of capacitor C105.

When transistor Q110 turns on during the reception of the stop element, its collector potential is driven positive and this positive-going potential is applied to diode CR107 by way of he filter network thereby back-biasing diode CR107. Accordingly, diode CR107 blocks the first pulse applied by the squaring flip-flop to the blocking oscillator in the event that the spacing start signal is received immediately following the stop signal which turned transistor Q110 on since transistor Q110 is cut off by transistor Q109 several milliseconds after the generation of the pulse associated with the start signal. The blocking of the pulse associated with the start signal provides an arrangement for maintaining the storage condition of the shift register circuit, FIG. 2, for two signal elements, as described hereinafter.

When transistor Q110 turns on, collector current is also applied by way of lead 114 and the winding of relay 2–CT1 to negative battery, operating relay 2–CT1. The functions of relay 2–CT1 are described subsequently.

Transistors Q111 and Q112 of the regenerator circuit are arranged in a bistable flip-flop circuit. The cross coupling from the collector of each transistor to the base of the other insures that if one of the transistors is off, the other is on.

As previously described, at the midpoint of each signal element, a positive pulse is applied from lead 103 to diode CR115 by way of capacitor C134 and a negative pulse is applied by way of leads 105 and 107, resistor R172 and capacitor C133 to diode CR116. The incoming signals repeated by line relay 1–LN to lead 102 are applied by way of resistors R170 and R171 to control diode gates CR115 and CR116, respectively. When a marking signal is being received, the negative battery on lead 102 is applied by way of resistor R170 to back-bias diode CR115 and by way of resistor R171 to forward-bias diode CR116 whereby the negative pulse applied by way of capacitor C133 turns on or maintains on transistor Q112 and turns off or maintains off transistor Q111. When a spacing signal is being received, the positive potential on lead 102 is applied by way of resistor R171 to back-bias diode CR116 and by way of resistor R170 to forward-bias diode CR115. Accordingly, the positive pulse on lead 103 is applied by way of capacitor C134 and diode CR115 to the base of transistor Q112 turning off or maintaining off transistor Q112 and turning on or maintaining on transistor Q111. As each pulse generated by the squaring flip-flop occurs during the middle of each teletypewriter element, the regenerator flip-flop is switched at the midpoint of each signal element in accordance with the marking or spacing condition of the incoming line.

Diode CR114, connected in series with resistor R168 between the base of transistor Q112 and positive battery, maintains the voltage on the base of transistor Q112 and on diodes CR115 and CR116 relatively constant thereby stabilizing the gating action of the diodes and facilitating the turning on of transistor Q112.

One output of the regenerator, connected to the collector of transistor Q111 is connected to a driving circuit of teletypewriter receiver 351, FIG. 3, by way of resistor R160 and lead 113. Another output, connected to the collector of transistor Q112, is applied to the input of a shift register by way of resistor R165 and lead 115. During the reception of each marking element, the potential on lead 113 is driven in a negative direction and the potential on lead 115 is driven in a positive direction. Conversely, during the reception of each spacing element, the potential on lead 113 is driven in a positive direction and the potential on lead 115 is driven in a negative direction.

The shift register in FIG. 2 comprises five bistable circuits. The circuit of transistors Q203 and Q204 in shift register stage SR–5 is typical of the shift register stages and is arranged to form a bistable hook circuit similar to the squaring flip-flop circuit of FIG. 1. Thus, the two transistors are either both in the ON or both in the OFF condition. Each positive pulse applied to lead 112 by the blocking oscillator is applied to the base of transistor Q203 by way of diode CR205 to turn off or keep turned off transistor Q203. The negative pulse which is applied 60 microseconds later to lead 111 by the blocking oscillator turns transistor Q203 on if diode CR204 is forward-biased. If diode CR204 is back-biased at this time, transistor Q203 will remain off.

Diode CR204 is controlled by capacitor C207 which in turn is controlled by the regenerator pulses applied by way of lead 115. If transistor Q112 is conducting in response to the reception of a marking signal, the positive potential swing applied to lead 115 charges capacitor C207 in a positive direction by way of resistor R217. If transistor Q112 is nonconducting in response to the reception of a spacing signal, capacitor C207 charges negatively. However, since resistor R217 in series with capacitor C207 provides a delay between the generation of the regenerator pulse and the charging of capacitor C207, the biasing of diode CR204 by the received signal element occurs after the pulse associated with the signal element is applied by the blocking oscillator to diode CR204 by way of lead 111. Consequently, shift register stage SR–5 is controlled jointly by the received teletypewriter signal element and the blocking oscillator pulse associated with the next successive signal element.

Returning now to the charging of capacitor C207, the received spacing element negatively charges the capacitor whereby diode CR204 is back-biased by way of resistor R218. Conversely, a received marking element charges capacitor C207 to forward-bias diode CR204. Accordingly, transistor Q203 will be turned on in response to the negative blocking oscillator pulse applied to lead 111 when the previous teletypewriter element is marking and will remain off when the previous teletypewriter element is spacing.

When transistors Q203 and Q204 are in the ON (mark) condition, the emitter of transistor Q204 is rendered positive and this positive potential is applied to the next shift register stage SR–4. Conversely, when the transistors are in the OFF (space) condition, the emitter of transistor Q204 is rendered negative and this negative condition is applied to the input of shift register stage SR–4.

Each of the shift register stages is substantially identical. Considering, for example, the shift register stage SR–1, the input circuit comprises resistor R244 and capacitor C219 which function in the same manner as resistor R217 and capacitor C207 in the shift register stage SR–5. In addition, the pulse on lead 112 is applied by way of diode CR217 to turn the stage SR–1 off in substantially the same manner as the application of the pulse by way of diode CR205 turns the stage SR–5 off. The application of the pulse on lead 111 is now applied to diode CR216 which turns the stage SR–1 on in the event that the diode is forward-biased. Recalling now that each stage is set on in response to an ON (mark) condition, applying a positive potential to the next stage, it is thus seen that capacitor C219 is positively charged to forward-bias diode CR216 if stage SR–2 was previously in the ON (mark) condition. Accordingly, the pulse on lead 111 turns the stage SR–1 on, thereby shifting the ON (mark) condition from the stage SR–2 to the stage SR–1. Thus, each mark or space condition is shifted into stage SR–5 and then successively to stages SR–4, SR–3, SR–2 and SR–1 in response to the blocking oscillator pulses. Since the seventh pulse in each start-stop cycle shifts the sixth signal element, which comprises the fifth intelligence element in the teletypewriter signal, into the stage SR–5, it is thus seen that this last pulse generated by the blocking oscillator stores the five intelligence elements in the shift register stages. Since, as previously described, the next generated pulse cannot occur before a delay equal to the duration of two signal elements, the storage condition of the shift register is maintained for at least the duration of two signal elements. It is further apparent that if the first squaring flip-flop pulse of the next teletypewriter signal is blocked by diode CR107, as previously described, the stop element of the previous signal will not be shifted into the stage SR–5 of the shift register.

The output of each stage of the shift register is also connected to the winding of an associated 2–EL relay. For example, the emitter of transistor Q204 of the stage SR–5 is connected to the winding of relay 2–EL5 by way of diode CR206 and resistor R225. Similarly, the emitter of transistor Q212 of the stage SR–1 is connected to the winding of relay 2–EL1 by way of diode CR218 and resistor R251. The other side of the winding of each of relays 2–EL5 through 2–EL1 is connected to lead 201 which extends to ground by way of resistor R252.

When a stage is in the OFF (space) condition, the output is rendered negative; for example, with the stage SR–5 off, negative potential is applied to the emitter of transistor Q204 by way of resistor R221. Under this condition, diode CR206 presents a high impedance to the current flow through the winding of relay 2–EL5 whereby the relay does not operate. When the stage SR–5 is in the ON (mark) condition, the positive transition of the emitter of transistor Q204 drives the emitter potential toward ground as determined by the emitter potential of transistor Q203. Under this condition, with ground applied to lead 201, relay 2–EL5 does not operate.

During the reception of the stop element of the teletypewriter character, transistor Q110 is turned on, operating relay 2–CT1, as previously described. The operation of relay 2–CT1 extends negative battery to lead 201 by way of the make contacts of the transfer contacts of relay 2-CT1. If, at this time, the stage SR–5 is in the ON (mark) condition whereby the emitter of relay Q204 is substantially at ground potential, current flows by way of diode CR206, resistor R225, the winding of relay 2–EL5 and the make contacts of relay 2–CT1 to negative battery, operating relay 2–EL5. Conversely, if the stage SR–5 is in the OFF (space) condition, the negative emitter potential of transistor Q204 precludes the operation of relay 2–EL5. Accordingly, relays 2–EL1 through 2–EL5 are operated in accordance with the conditions of the associated stages of the shift register. Since during the reception of the stop element the five intelligence elements are stored in the shift register, relays 2–EL1 through 2–EL5 are operated in accordance with the received teletypewriter signal.

The operation of relay 2–CT1 also opens the operating path of normally operated relay 2–CT2. Relay 2–CT2 released, opens the operating path of normally operated relay 3–CT3, FIG. 3. The release of relays 2–CT2 and 3–CT3 applies ground by way of the break contact of transfer contacts 2–CT2 and, in shunt thereto, the break contacts of relay 3–CT3 to lead 301. Lead 301 extends, in parallel, to the transfer contacts or relays 2–EL1 and 2–EL2 and then to the windings of relays 3–F1 through 3–F8 whereby relays 3–F1 through 3–F8 are operated in accordance with the operated conditions of relays 2–EL1, 2–EL2, 2–EL3 and 2–EL5 as described hereinafter. In addition, the release of relay 3–CT3 applies ground by way of the break contacts of the make-before-break contacts of relays 3–CT3 and lead 302 to the transfer contacts of relay 2–EL4. This ground is then extendible by way of the break contacts of relays 3–F1 through 3–F8 to output fan terminals as described hereinafter.

The circuit may be arranged to cut on a teletypewriter receiver in response to a cut-on character A, for example, whereby the teletypewriter records incoming line signals until deactivated by an end-of-message sequence which may comprise the characters Figures and H.

Select magnet 352 of teletypewriter recorder 351 is connected to the plate of tube 350. In the normal idle condition positive battery is applied to the grid electrode of tube 350 by way of resistors R309, R308 and R307 whereby plate current is drawn by way of select magnet 352 and recorder 351 is maintained in the idle marking condition. Recalling now that the potential on lead 113 is rendered positive in response to the reception of a spacing signal and negative in response to the reception of a marking signal, it is noted that lead 113 extends to the base of transistor Q301. Accordingly, the reception of a marking signal turns on transistor Q301 and the reception of a spacing signal cuts off transistor Q301. Since the collector of transistor Q301 is connected to the grid of tube 350 by way of resistor R306, the make contacts of relay 3–A and resistor R307, the operation of relay 3–A, as described hereinafter, and the reception of a marking signal which turns on transistor Q301 will apply the positive collector potential of transistor Q301 to the grid of tube 350 whereby tube 350 repeats the marking signal to select magnet 352. Conversely, the reception of a spacing signal cuts off transistor Q301 whereby a negative potential is applied by way of resistors R305 and R306, the make contacts of relay 3–A, if the relay is operated, and resistor R307 to the grid of tube 350 whereby a spacing signal is repeated to select magnet 352. Accordingly, the received teletypewriter signal is regnerated and applied to select magnet 352 of recorder 351 when relay 3–A is operated.

Assuming now that the teletypewriter character A, which comprises the intelligence elements mark-mark-space-space-space, is received and stored in the shift register it is seen that when relay 2–CT1 operates shift register stages SR–1 and SR–2 are in the ON (mark) condition whereby relays 2–EL1 and 2–EL2 operate. As previously described, the operation of relay 2–CT1 releases relay 2–CT2 which in turn releases relay 3–CT3. Ground is thus applied to lead 301, as previously described, and this ground is extended by way of the make contacts of transfer contacts 2–EL1, the winding of relay 3–F2, diode CR302, the break contacts of transfer contacts 2EL5 and resistor R302 to negative battery, operating relay 3–F2. In addition, the ground on lead 301 is applied by way of the make contacts of relay 2–EL2, the winding of relay 3–F6, diode CR306, the break contacts of transfer contacts 2–EL3 and resistor R303 to negative battery, operating relay 3–F6. With relay 3–CT3 released, an operating path is completed from ground by way of the break contacts of the make-before-break contacts of relay 3–CT3, lead 302, the break contacts of the transfer contacts of relay 2–EL4, the make contacts of relay 3–F2, and the make contacts of relay 3–F6 to terminal A of the relay fan and then by way of the terminal strapping and the winding of relay 3–A to battery, operating relay 3–A which locks by way of its own make contacts and the break contacts of relay 3–H. In addition, the operation of relay 3–F2 applies negative battery to lead 201 in shunt to make contacts 2–CT1.

Accordingly, the reception of the teletypewriter character A operates relay 3–A which in turn renders recorder 351 responsive to incoming teletypewriter signals, as previously described.

When transistor Q110 restores to the OFF condition, as previously described, relay 2–CT1 releases, reoperating relay 2–CT2 which in turn reoperates relay 3–CT3. The operation of relay 3–ST3 removes the ground on terminal A of the fan which was applied by way of the lead 302. In addition, the operation of relays 2–CT2 and 3–CT3 removes the ground on lead 301 whereby relays 3–F2 and 3–F6 release. The release of relay 3–F2 removes the negative battery applied to the windings of relays 2–EL1 through 2–EL5 by way of lead 201 whereby relays 2–EL1 and 2–EL2 release. The relay circuitry is now restored to its initial condition with the exception that relay 3–A is locked operated.

At the conclusion of the message, the code sequence Figures-H is received. The reception of the character figures, which comprises the intelligence elements mark-mark-space-mark-mark, renders the shift register stages SR–1, SR–2, SR–4 and SR–5 to the ON (mark) condition when relay 2–CT1 operates. Accordingly, relays 2–EL1, 2–EL2, 2–EL4 and 2–EL5 operate in response to the reception of the character Figures. The subsequent release of relays 2–CT2 and 3–CT3 applies ground to lead 301 and this ground is extended by way of make contacts 2–EL1, the winding of relay 3–F1, diode CR301, make contacts 2–EL5 and resistor R302 to negative battery, operating relay 3–F1. In addition, the ground on lead 301 is extended by way of make contacts 2–EL2, the winding of relay 3–F6, diode CR306, break contacts 2–EL5 and resistor R303 to negative battery, operating relay 3–F6. An operating path is thus completed from ground by way of the break contacts of make-before-break contacts 3–CT3, lead 302, make contacts 2–EL4, make contacts 3–F6, make contacts 3–F1 and the winding of relay 3–FG to battery, operating relay 3–FG. In addition, the operation of relay 3–F1 maintains negative battery on the windings of relays 2–EL1 through 2–EL5.

The subsequent turning off of transistor Q110 releases relay 2–ST1 followed by the reoperation of relays 2–CT2 and 3–CT3, as previously described. The reoperation of relays 3–CT3 completes a holding path for relay 3–FG by way of the make contacts of relay 3–FG and the make contacts of make-before-break contacts 3–CT3. In addition, the reoperation of relay 3–CT3 opens the previously-described operating path for relay 3–FG. The reoperation of relays 3–CT3 and 2–CT2 opens the previously-described operating paths for relays 3–F1 and 3–F6, releasing these relays, and the release of relay 3–F1 in turn removes negative battery from the windings of the 2–EL relays whereby relays 2–EL1, 2–EL2, 2–EL4 and 2–EL5 release.

If the next teletypewriter signal is the character H, which comprises the intelligence elements space-space-mark-space-mark, relays 2–EL3 and 2–EL5 operate when relay 2–CT1 operates. The subsequent release of relay 2–CT2 applies ground to lead 301, as previously described. The ground on lead 301 is extended by way of break contacts 2–EL1, the winding of relay 3–F3, diode CR303, make contacts 2–EL5 and resistor R302 to negative battery, operating relay 3–F3. In addition, the ground on lead 301 is extended by way of break contacts 2–EL2, the winding of relay 3–F7, diode CR307, make contacts 2–EL3 and resistor R303 to negative battery, operating relay 3–F7. The subsequent release of relay 3–CT3 applies ground by way of the break contacts of make-before-break contacts 3–CT3, lead 302, break contacts 2–EL4, make contacts 3–F3 and make contacts 3–F7 to the H terminal in the relay fan. The ground on the H terminal extends to the winding of relay 3–FG by way of diode CR310 and make contacts 3–FG, maintaining relay 3–FG operated. In addition, the ground on the H terminal extends by way of make contacts 3–FG and the winding of relay 3–H to battery, operating relay 3–H which opens the locking path of relay 3–A. The consequent release of relay 3–A disconnects the collector of transistor Q301 from the grid of tube 350 whereby teletypewriter receiver 351 is restored to its initial idle condition.

The subsequent release of relay 2–CT1 reoperates relays 2–CT2 and 3–CT3, opening the previously-described operating paths for relays 3–F3, 3–F7 and 3–H. This in turn releases relays 2–EL3 and 2–EL5. Relay 3–FG is maintained operated, however, by way of make contacts 3–FG and make contacts 3–CT3. When relay 3–CT3 releases at the end of the next teletypewriter character, relay 3–FG releases whereby the circuit is restored to the normal idle condition.

Although a specific embodiment of the invention has been shown and described, it will be understood that various modifications may be made without departing from the spirit of this invention and within the scope of the appended claims.

What is claimed is:

1. A selector circuit for translating permutation code signals having signal elements comprising, a receiver for receiving said code signals, a pulse generator responsive to the reception of each of said code signals by said receiver for generating at successive intervals a pulse for each of said elements thereof, a shift register, means responsive to the reception of each of said elements by said receiver for storing said element in said shift register, means for shifting each of said elements stored in said shift register in response to the generation of a pulse by said pulse generator, and further means responsive to said pulse generator for disabling said shifting means for a duration of time exceeding said interval between generated pulses whereby the storage condition of said shift register is maintained for an interval equal to the duration of at least two elements.

2. A selector circuit for translating permutation code signals having signal elements comprising, a receiver for receiving said code signals, a pulse generator responsive to the reception of each of said code signals by said receiver for generating at successive intervals a pulse for each of said elements thereof, means enabled by said pulse generator for stopping said pulse generator upon the generation of a predetermined number of pulses equal in number to the elements in each code signal, a shift register, means responsive to the reception of each of said elements by said receiver for storing said element in said shift register, means for shifting each of said elements stored in said shift register in response to the generation of a pulse by said pulse generator, and further means responsive to said enabled means for disabling said shifting means for a duration of time exceeding said interval between generated pulses whereby the storage condition of said shift register is maintained for an interval equal to the duration of at least two elements.

3. A selector circuit for translating permutation code signals having a start element, a stop element and intermediate intelligence elements comprising a receiver for receiving said code signals, a pulse generator responsive to the reception of each of said code signals by said receiver for generating at successive intervals a pulse for each of said elements thereof, means enabled by said pulse generator for stopping said pulse generator upon the generation of a predetermined number of pulses equal in number to the elements in each code signal, a shift register, means responsive to the reception of each of said elements by said receiver for storing said element in said shift register, means for shifting each of said elements stored in said shift register in response to the generation by said pulse generator of the pulse associated with the next successive one of said elements, and further means responsive to said enabled means for disabling said shifting means for a duration of time exceeding said interval between generated pulses; whereby the storage condition of said shift register is maintained for an interval equal to the duration of a stop element and a start element.

4. A selector circuit for translating permutation code signals having a start element, a stop element and intermediate intelligence elements comprising, a receiver for receiving said code signals, a pulse generator responsive to the reception of each of said code signals by said receiver for generating at successive intervals a pulse for each of said elements thereof, means enabled by said pulse generator for stopping said pulse generator upon the generation of a predetermined number of pulses equal in number to the elements in each code signal, a shift register, means responsive to the reception of each of said elements by said receiver for storing said element in said shift register, means for shifting each of said elements stored in said shift register in response to the generation by said pulse generator of the pulse associated with the next successive one of said elements, a normally disabled relay operated in accordance with the storage condition of said shift register, means responsive to said enabled means for enabling said relay, and further means responsive to said enabled means for disabling said shifting means for a duration of time exceeding said interval between generated pulses whereby the storage condition of said shift register is maintained for an interval equal to the duration of a stop element and a start element.

5. A selector circuit for translating permutation code signals having signal elements comprising, a receiver for receiving said code signals, a pulse generator responsive to the reception of each of said code signals by said receiver for generating at successive intervals a pulse for each of said elements thereof, a storage circuit, means jointly responsive to the reception of each of said elements by said receiver and the generation of a pulse by said pulse generator for storing said element in said storage circuit, and further means responsive to said pulse generator for disabling said jointly responsive means for a duration of time exceeding said interval between generated pulses.

6. A selector circuit for translating permutation code signals having signal elements comprising, a receiver for receiving said code signals, a pulse generator responsive to the reception of each of said code signals by said receiver for generating at successive intervals a pulse for each of said elements thereof, means enabled by said pulse generator for stopping said pulse generator upon the generation of a predetermined number of pulses equal in number to the elements in each code signal, a shift register, means jointly responsive to the reception of each of said elements by said receiver and the generation by said pulse generator of the pulse associated with the next successive one of said elements for storing said elements in said shift register, and further means responsive to said enabled means for disabling said jointly responsive means for a duration of time exceeding said interval between generated pulses.

7. A selector circuit for translating permutation code signals having a start element, a stop element and intermediate intelligence elements comprising, a receiver for receiving said code signals, a pulse generator responsive to the reception of each of said code signals by said receiver for generating at successive intervals a pulse for each of said elements thereof, means enabled by said pulse generator for stopping said pulse generator upon the generation of a predetermined number of pulses equal in number to the elements in each code signal, a shift register, means jointly responsive to the reception of each of said elements by said receiver and the generation by said pulse generator of the pulse associated with the next successive one of said elements for storing said element in said shift register, a normally disabled relay operated in accordance with the storage condition of said shift register, means responsive to said enabled means for enabling said relay, and further means responsive to said enabled means for disabling said jointly responsive means for a duration of time exceeding said interval between generated pulses.

8. A selector circuit for translating permutation code signals having signal elements comprising, a receiver for receiving said code signals, a pulse generator responsive to the reception of each of said code signals by said receiver for generating a pulse for each of said elements thereof, means enabled by said pulse generator for stopping said pulse generator upon the generation of a predetermined number of pulses equal in number to the elements in each code signal, a shift register responsive to the reception of each of said elements by said receiver for storing said element, means for shifting each of said elements stored in said shift register in response to the generation of a pulse by said pulse generator, further means responsive to said enabled means for disabling said shifting means for a duration of time, and means responsive to the generation of a subsequent pulse for thereafter re-enabling said shifting means.

9. A selector circuit for translating permutation code signals having signal elements comprising, a receiver for receiving said code signals, a pulse generator responsive to the reception of each of said code signals by said receiver for generating at successive intervals a pulse for each of said elements thereof, means enabled by said pulse generator for stopping said pulse generator upon the generation of a predetermined number of pulses equal in number to the elements in each code signal, a shift register, means jointly responsive to the reception of each of said elements by said receiver and the generation by said pulse generator of the pulse associated with the next successive one of said elements for storing said element in said shift register, further means responsive to said enabled means for disabling said jointly responsive means for a duration of time, and means responsive to the generation of a subsequent pulse for thereafter re-enabling said jointly responsive means.

References Cited in the file of this patent

UNITED STATES PATENTS 2,878,313 Tolson et al. ------------ Mar. 17, 1959